(12) United States Patent
Melzer (10) Patent No.: US 11,080,007 B1
(45) Date of Patent: Aug. 3, 2021

(54) INTELLIGENT AUDIO PLAYBACK RESUMPTION

(71) Applicant: SAP SE, Walldorf (DE)

(72) Inventor: Jan Lukas Max Aljoscha Melzer, Bretten (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/782,964

(22) Filed: Feb. 5, 2020

(51) Int. Cl.
*G06F 3/16* (2006.01)
*G06N 20/00* (2019.01)

(52) U.S. Cl.
CPC ............... *G06F 3/165* (2013.01); *G06F 3/167* (2013.01); *G06N 20/00* (2019.01)

(58) Field of Classification Search
CPC .......... G06F 3/165; G06F 3/167; G06N 20/00
See application file for complete search history.

(56) References Cited

U.S. PATENT DOCUMENTS

| | | | | |
|---|---|---|---|---|
| 9,182,940 B1 * | 11/2015 | Chen | ...................... | G06F 16/638 |
| 10,057,630 B1 * | 8/2018 | Panchaksharaiah | .... | G11B 27/11 |
| 2011/0301728 A1 * | 12/2011 | Hamilton | ............... | G11B 27/30 700/94 |
| 2015/0169279 A1 * | 6/2015 | Duga | ...................... | G06F 3/165 700/94 |
| 2019/0132639 A1 * | 5/2019 | Panchaksharaiah | | ........................ H04N 21/2387 |
| 2020/0007943 A1 * | 1/2020 | Filmeyer | ............... | G06F 16/745 |

* cited by examiner

*Primary Examiner* — Fan S Tsang
*Assistant Examiner* — David Siegel
(74) *Attorney, Agent, or Firm* — Fountainhead Law Group P.C.

(57) ABSTRACT

The present disclosure pertains to audio playback resumption and adjustment of audio resumption settings based on feedback. A first date timestamp and a playback timestamp of audio content may be stored when pausing audio content. Then when resuming the audio content, a time interval between the first date timestamp and a current date timestamp may be determined. A resumption timestamp in the audio content may be determined based on the time interval being within a certain time range. After resuming playback, a feedback input may be determined. The feedback may be used in adjusting the resumption settings. The adjusted resumption settings may be used in subsequent resumption of the same or different content.

15 Claims, 6 Drawing Sheets

| Time Interval | Music | Podcast | Audiobook |
|---|---|---|---|
| Less than 1 min | None | None | None |
| 1 min – 15 min | Full | Sentence | Sentence |
| 15 min – 24 hours | Full | Section | Section |
| 24 hours – 30 days | Full | Full | Chapter |
| More than 30 days | Full | Full | Full |

INTELLIGENT AUDIO PLAYBACK RESUMPTION

BACKGROUND

The present disclosure relates to computing, audio media, and data processing, and in particular to audio playback resumption.

Music, podcasts, audiobooks, and other audio content are enjoyed by many people. However, audio content may be interrupted during playback. This may be problematic for certain audio content as the context may be lost depending on the length of time between pausing and resuming playback. Certain playback software for audio content may resume the playback with a repetition of the last three to five seconds. This playback resumption technique may enable the listener to recall the context after short interruptions or suffice for music playback. However, it may not enable the listener to recall the context after longer pauses.

The present disclosure addresses these issue and others, as further described below.

SUMMARY

The present disclosure provides a computer-implemented method. The method includes storing a first date timestamp and a playback timestamp of audio content. The storing may be performed in response to a pause input. The method further includes determining a time interval between the first date timestamp and a second date timestamp. The determining of the time interval may be performed in response to a play input. The method further includes determining a resumption timestamp based on the time interval being within a time range. The method further includes determining a feedback input. The feedback input may be determined after resuming playback of the audio content at the resumption timestamp. The method further includes adjusting the time range to an adjusted time range based on the feedback input and the time interval. The adjusted time range may be usable in subsequent resumption of content.

Another embodiment of the present disclosure provides a non-transitory machine-readable medium storing a program. The program may be executable by at least one processing unit of a device. The program includes sets of instructions for storing a first date timestamp and a playback timestamp of audio content. The storing may be performed in response to a pause input. The program further includes sets of instructions for determining a time interval between the first date timestamp and a second date timestamp. The determining of the time interval may be performed in response to a play input. The program further includes sets of instructions for determining a resumption timestamp based on the time interval being within a time range. The program further includes sets of instructions for determining a feedback input after resuming playback of the audio content at the resumption timestamp. The program further includes sets of instructions for adjusting the time range to an adjusted time range based on the feedback input and the time interval. The adjusted time range usable in subsequent resumption of content.

Another embodiment of the present disclosure provides a computer system. The computer system includes one or more processors and memory. The computer system also includes computer program code including instructions that are executable on the one or more processors. The computer program code is configured to store a first date timestamp and a playback timestamp of audio content. The storing may be performed in response to a pause input. The computer program code is further configured to determine a time interval between the first date timestamp and a second date timestamp. The determination of the time interval may be performed in response to a play input. The computer program code is further configured to determine a resumption timestamp based on the time interval being within a time range. The computer program code is further configured to determine a feedback input after resuming playback of the audio content at the resumption timestamp. The computer program code is further configured to adjust the time range to an adjusted time range based on the feedback input and the time interval. The adjusted time range usable in subsequent resumption of content.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein. The terms "first," "second," "third," "fourth," etc. may be used to differentiate between similar terms or phrases and do not necessarily indicate an order unless otherwise indicated.

As mentioned above, audio content (e.g., music, podcasts, and audiobooks) may be interrupted during playback. This may be problematic as the context may be lost depending on the length of time between pausing and resuming playback. Certain playback software for audio content may resume the playback with a repetition of the last three to five seconds, for example. However, such a short amount of rewinding may not be sufficient for the listener to recall the context of the audio content unless the pause interruption was short (e.g., a few seconds). Rewinding three to five seconds, for example, may not enable the listener to recall the context after longer pauses (e.g., a few minutes).

The present disclosure provides intelligent audio playback resumption systems and methods to solve the context loss problem discussed above. The intelligent resumption technique may rewind the audio content to an earlier position upon resumption of playback in order to restore the context. The rewind length can be determined based on context complexity and interruption duration. Context complexity may be determined based on the type of audio content, differentiating between music, podcasts, audiobooks, and other audio content. For example, when resuming interrupted music, the listener may determine whether they remember which song they were last listening to. If the listener remembers, then the context has not been lost and the intelligent resumption technique may resume the audio content from where the music was paused. If the listener does not remember, the intelligent playback technique may begin playing the song from start.

For audiobooks the context complexity is higher. It may be possible to segment audiobook content into the sentence context, section context (e.g., a plurality of sentences), chapter context, and the full audiobook context. As this allocation is hierarchal, the intelligent resumption technique may restore the context at the needed level. For example, the intelligent resumption technique may rewind to the beginning of the current sentence (e.g., the sentence being spoken when the audio was paused), the beginning of the current section, or the start of the chapter, for example.

The context loss may be determined based on the length of time that the audio content was paused because an increasing amount of time may cause more of the listener's memory of the context to fade. The length of the pause interval may be determined by storing the time (e.g., a date timestamp) of when a playback was paused and determining the time that playback was resumed (e.g., using another date timestamp). The pause interval and loss of context may be used to determine to start resumption of the audio content (e.g., how far into the audio content to begin playback on resumption).

This also leads to the question of how long the context persists in the memory until it is lost. While context loss could be estimated based on scientific research, such estimates would not be accurate for every listener. Instead, the intelligent resumption technique discussed herein starts with a predetermined context loss time ranges and provides adjustments on a user-based level. This may be achieved using reinforced learning to modify resumption settings based on feedback from the listener such that the resumption settings match their individual memory performance.

When paused audio content is resumed, the resumption settings including the time ranges of context losses are used to set the respective resumption point. For music, the intelligent resumption technique may resume playback at either the pausing point or at the start of the song. For spoken word audio such as podcasts and audiobooks, the audio signal may be analyzed in order to contextually segment the audio content. In some embodiments, the audio content may be enriched with a corresponding transcript, which may be analyzed to contextually segment the audio content. As such, the intelligent playback technique may determine audio timestamps corresponding to the start of the current sentence, section, or chapter, for example, and use these timestamps to determine how far to rewind the audio content depending on the pause interval indicating how much context was lost.

The listener (e.g., user) may be provided with a user interface for selecting contextual resumption settings. The user interface may enable the listener to set pause time ranges for different audio content types and context loss amounts, thereby setting the resumption point upon playback. The user may be presented with default settings and be able to adjust those settings.

For example, the default resumption settings for audiobooks may set playback to be resumed at the pause time if less than one minute has elapsed since pausing, or at the start of the current sentence if more than one minute but less than fifteen minutes have elapsed, or at the start of the current section (e.g., plurality of sentences) if more than fifteen minutes but less than twenty-four hours have elapsed, or at the start of the chapter if more than twenty-four hours but less than thirty days have elapsed, or at the start of the audiobook if more than thirty days have elapsed. The user may adjust the time ranges for each different context (e.g., none, sentence, section, chapter, or full book).

The user interface may also enable the user to activate reinforced learning of the resumption settings. For example, the intelligent audio resumption technique may use feedback from the user (e.g., feedback based on user input to control audio playback or responses to prompted questions) with a reinforced learning algorithm to automatically adjust the resumption settings. In addition, the user interface may present the adjusted resumption settings to the user such that they can be manually reviewed and configured after the automatic adjustments.

The intelligent audio playback resumption systems and methods described herein provide advantages over prior audio playback techniques. As mentioned above, certain prior playback software for audio content may resume the playback with a repetition of the last three to five seconds. However, this playback resumption technique may not enable the listener to recall the context after longer pauses.

The intelligent audio playback resumption systems and methods described herein are advantageous because they enable the audio to be rewound further back such that the listener may recall the lost context. In addition, the audio resumption point for an audiobook may be set to the beginning of the current sentence, section, or chapter such that the listener can hear the complete context again, minimizing the amount of manual seeking required (e.g., rewinding and/or fast-forwarding one or more times to find the desired resumption point). Furthermore, the automatic adjustment of the resumption settings using reinforced learning based on listener feedback is advantageous because it enables the resumption point to match the context actually lost by the listener. The automatic adjustment using reinforced learning also provides for the resumption settings to change as the listeners memory and recollection capacity changes.

Figure 1:
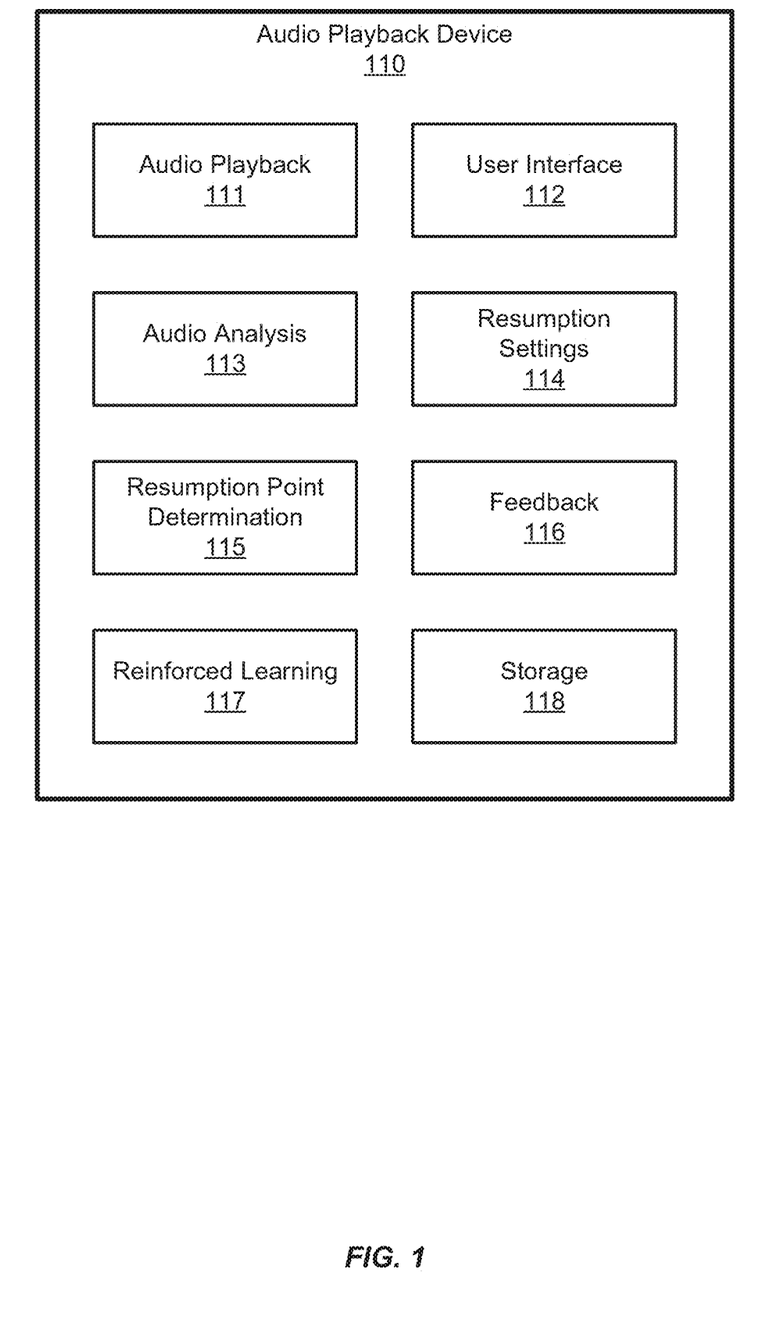
FIG. 1 shows a functional block diagram of an audio playback device, according to an embodiment.
Figure 6:
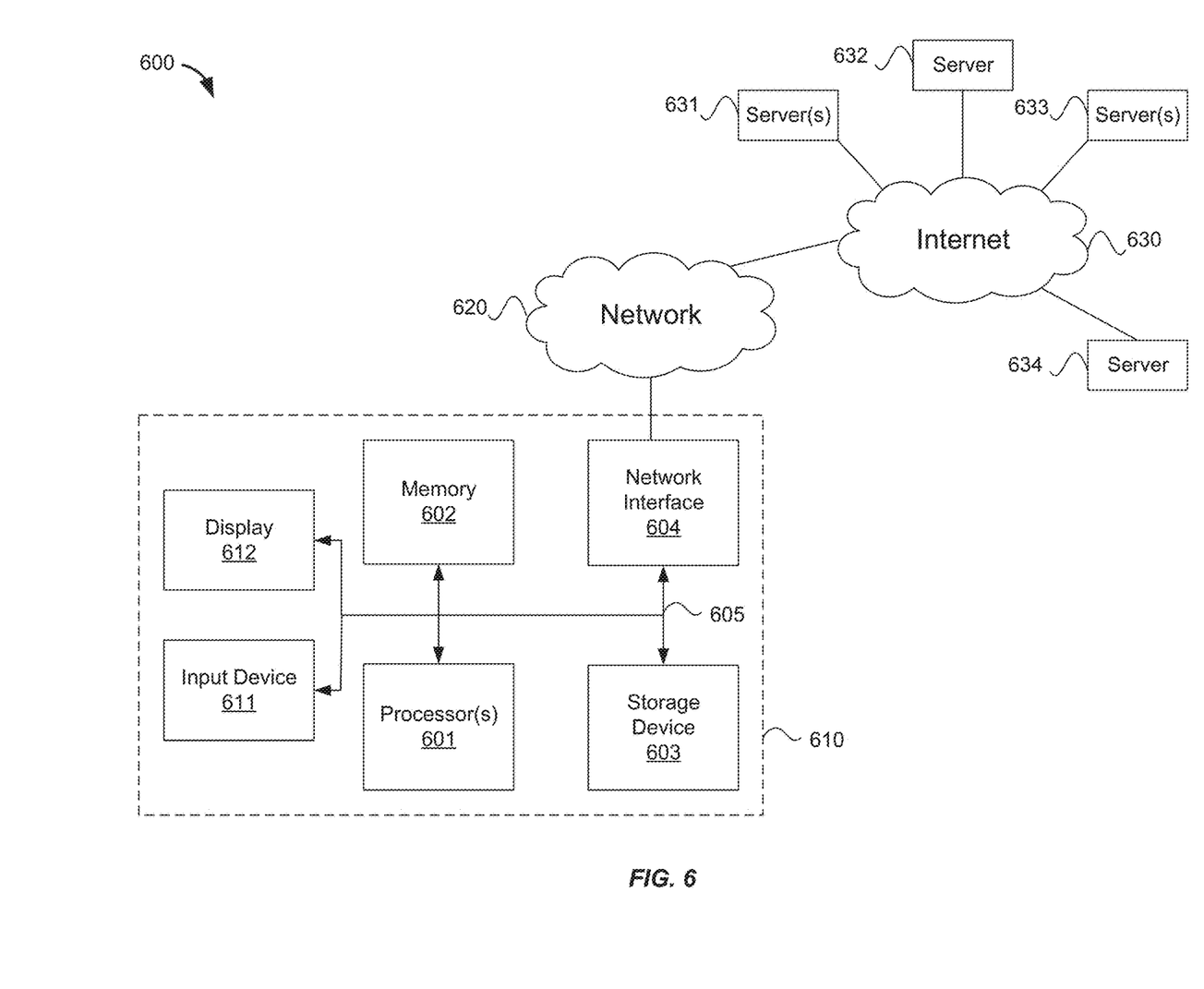
FIG. 6 shows a diagram of hardware of a special purpose computing machine for implementing systems and methods described herein.

The intelligent audio playback resumption techniques may be implemented by audio playback software executed by an audio playback device. FIG. 1 shows a functional block diagram of an audio playback device 110, according to an embodiment. The audio playback device 110 may be a portable user device (e.g., a smart phone, tablet, smart watch, etc.) or a computer (e.g., laptop, notebook, or desktop computer). The audio playback device 110 may include hardware such as a processing unit, system memory, and storage memory, for example. The audio playback device 110 may be implemented as the computer system 610 is illustrated in FIG. 6, for example.

As shown in FIG. 1, the audio playback device 110 includes several functional software modules used to perform intelligent audio playback. The audio playback device 110 includes an audio playback software module 111, a user interface software module 112, an audio analysis software module 113, a resumption settings software module 114, a resumption point determination software module 115, a feedback software module 116, a reinforced learning software module 117, and a storage software module 118.

The audio playback software module 111 may be configured to perform playback of audio content (e.g., a music track, a podcast, or an audio book). The audio playback software module 111 may be configured to enable play and pause of the audio content as well as fast-forwarding and rewinding, for example. The audio playback software module 111 may also provide for skipping forward and backward in the audio content. In some embodiments, the skipping forward and backward functionality may be based on the contextual segments of audio content described below. For instance, the audio playback software module 111 may provide for incrementally skipping forward/backward to the start of the next/previous layer in the context hierarchy where, for example, the chapter context includes one or more section contexts, and each section context includes one or more sentence contexts.

The user interface software module 112 may be configured to provide an audio playback user interface for controlling or operating the audio playback provided by the audio playback software module 111. For example, the user interface software module 112 may be configured to provide a play control button, a pause control button, a play/pause control button, a fast-forward control button, a rewind control button, a skip-forward control button, and a skip-backward control button, for example. Exemplary audio playback user interfaces are described below with respect to FIG. 3.

The user interface software module 112 may also be configured to provide a resumption settings user interface that enables a user to review and set resumption settings. For example, the resumption setting user interface may display different contexts in a context hierarchy and the pause interval time ranges that corresponding to loss of those contexts. The resumption settings user interface may present default or adjusted resumption settings (if the default settings have been adjusted), enable the user to change the current resumption settings, enable the user to active reinforced learning of the resumption settings, and enable the user to provide feedback to the reinforced learning.

In one example, the resumption settings user interface may show a context hierarchy for audiobooks that includes a full book context, which includes one or more chapter contexts, which includes one or more section contexts, which includes one or more sentence contexts. In this example, the resumption settings user interface may show a different pause time range corresponding to each different type of context within the context hierarchy.

For example, the sentence context may be used for resumption if more than one minute but less than fifteen minutes have elapsed, the section context may be used for resumption if more than fifteen minutes but less than twenty-four hours have elapsed, the chapter context may be used if more than twenty-four hours but less than thirty days have elapsed, and the full book context (e.g., the entire book) may be used for resumption if more than thirty days have elapsed. In addition, no loss of context may be used for resumption if less than one minute has elapsed.

The audio analysis software module 113 may be configured to contextually segment the audio content based on a stored context hierarchy defined for that type of audio content. As described above, audiobooks may have a context hierarchy includes the full book, chapters, sections, and sentences. The audio analysis software module 113 may determine which segments of audio content (e.g., time ranges within the audio content) correspond to the different contexts. One segment of audio content may be associated with more than one context. For example, a segment of audio corresponding to a particular sentence will also be included in a particular section and a particular chapter of the audiobook.

In order to determine the contextual segments, the audio analysis software module 111 may analyze a text-based transcript of the audio content if it is available or waveforms of the audio channels. With a text-based transcript, the contextual segments may be determined using metadata that indicates the context or by analyzing the structure and format of the text. With a waveform of the audio channels, the contextual segments may be determined based on a pause or break in the audio. The pause or break in the audio may be identified by determining that an amplitude of the audio waveform is less than a threshold for a period of time. In some embodiments, longer pauses or breaks may indicate types of contexts that are higher up in the context hierarchy.

For example, a short pause may indicate the beginning of a sentence while a longer break may indicate the start of a section (e.g., a set of related sentences). An even longer break may indicate the start of a chapter. Thus, the audio analysis software module 113 may be configured to determine the context type based on the length of the break/pause in the audio content. In addition, the audio analysis software module 113 may store audio timestamps corresponding to the start of each context. In some embodiments, the audio analysis of the audio content may be performed up-front (e.g., when playback is paused) or it may be performed on demand (e.g., when playback is resumed). In some embodiments, only the portion of audio preceding the pause point of the audio content may be analyzed in order to reduce the amount of computing resources used in processing the analysis.

The resumption settings software module 114 may be configured to store and update the resumption settings and configurations described herein. The resumption settings software module 114 may be configured to store time intervals corresponding to each of the context types in the context hierarchies for different types of audio, for example. For example, audiobooks may have a different hierarchy context compared to podcasts (e.g., podcasts may have sentence, section, and full contexts but may not have a chapter context) and the resumption settings software module 114 may be configured store different time intervals for the audiobooks compared to podcasts. The resumption settings software module 114 may be configured update the resumption settings based on user input and/or based on reinforced learning.

The resumption point determination software module 115 may be configured to determine the pause interval (e.g., length of time between pause and resume of the same audio content) and set the resumption point for audio playback at the start of the contextual segment corresponding to the loss of context indicated by the pause interval in the resumption settings. Using the example resumption settings given above (and shown in FIG. 3), if the pause interval is eight hours (falling in the range of fifteen minutes to twenty-four hours), then the loss of context (by the listener) is the current section and the resumption point is set to the start of the current section. The audio timestamp corresponding to the start of the section may be determined by the audio analysis software module 113 as discussed above.

The feedback software module 116 may be configured to determine feedback from the user to use in the reinforced learning process. The feedback software module 116 may be configured to determine use inputs to the user interface as feedback. For example, when playback is resumed at the start of a particular context level in the hierarchy, the feedback software module 116 may be configured to detect whether the user fast-forwards or rewinds from that point in the audio content within a certain period of time after playback is resumed.

In one example, playback is resumed at the start of the current section (e.g., the section during which the audio was paused). In this example, if the user rewinds further back from the start of that section within one minute of resuming playback, this can be used as feedback that the audio was not rewound far enough. In this case, the maximum of the time range corresponding to the section context may be reduced and similarly the minimum of the time range corresponding to the chapter context (the next context in the hierarchy) may be reduced based on the pause interval.

In some embodiments, the user can be prompted for their feedback on the contextual resumption. For example, the user may be able to indicate whether the resumption point is too far back or not far back enough, thereby indicating their actual loss of context.

The reinforced learning software module 117 may be configured to apply the user's feedback and the pause interval to a reinforcement learning algorithm in order to adjust the resumption settings. For example, when the feedback input includes a fast-forward input after resumption at a particular context, the minimum time of the context's time range may be increased. When the feedback includes a rewind input, and wherein the adjusting of the time range includes decreasing a maximum time of the time range (e.g. such that the pause interval would then land higher up in the context hierarchy).

The storage software module 118 may be configured to store date timestamps corresponding to the pause point and the resumption point such that the pause interval may be calculated. The storage software module 118 may be further configured to store the audio playback timestamps (e.g., how far into the audio content was the listener when the content was paused). The storage software module 118 may be further configured to store the resumption settings, including default settings and any adjusted settings.

Figure 2:
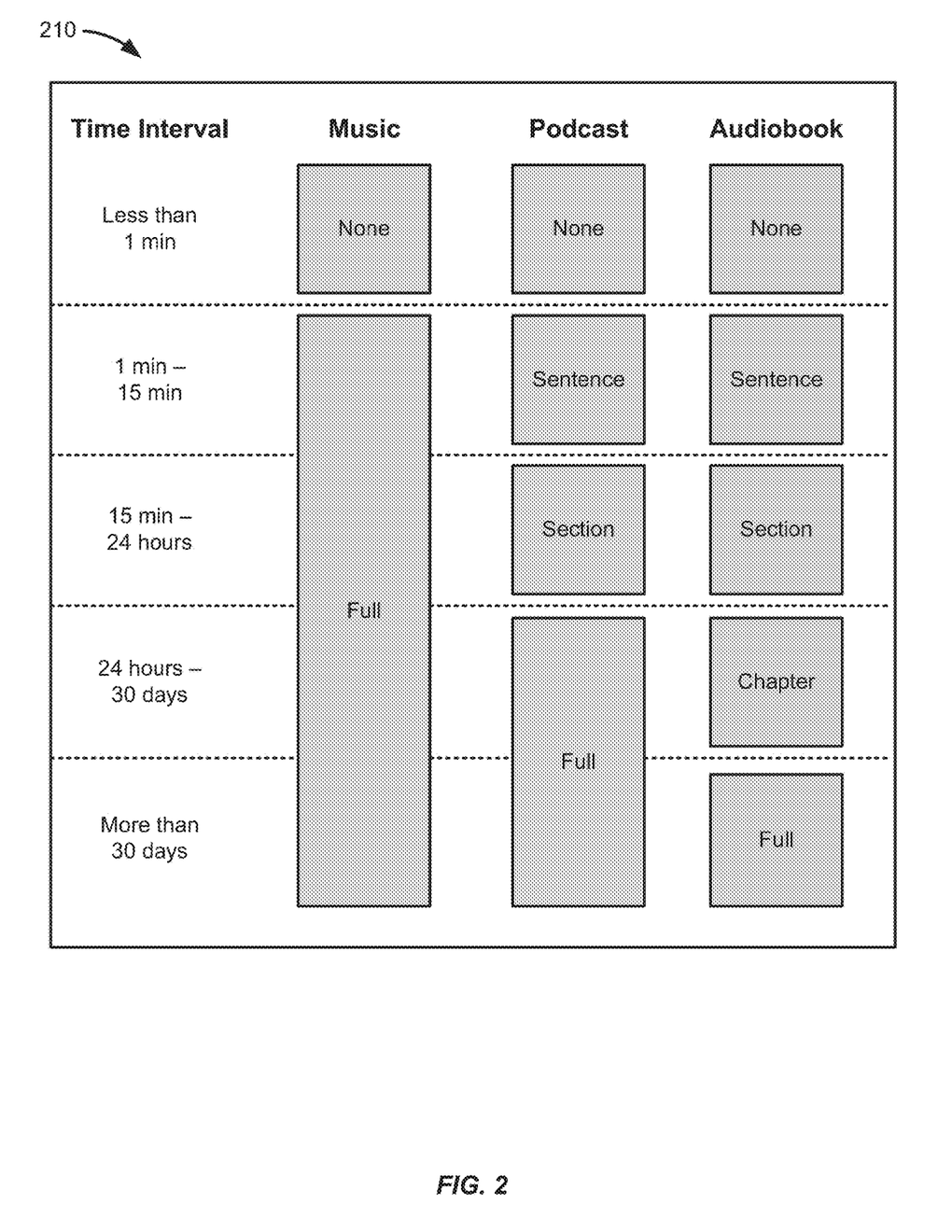
FIG. 2 shows an example graph of audio context loss over time, according to an embodiment.

FIG. 2 shows an example graph 210 of audio context loss over time, according to an embodiment. The graph 210 shows the pause time interval that corresponds to the expected loss context (within a hierarchy of contexts) for different types of audio content.

For example, as shown in FIG. 2, a pause interval of less than one minute corresponds to no loss of context for music, podcasts, and audiobooks. In this example, a pause interval of a minute or more corresponds to a full loss of context for music. However, a full loss of context occurs when twenty-four hours or more have passed for a podcast compared to a full loss of context occurring when more than thirty days have passed for an audiobook. As shown in FIG. 2, the chapter context for audiobooks is lost when the pause interval is twenty-four hours to less than thirty days. The section context for podcasts and audiobooks is lost when the pause interval is fifteen minutes to less than twenty-four hours. And the sentence context is lost for podcasts and audiobooks when the pause interval is one minute to less than fifteen minutes. Other embodiments may set different time ranges to these contexts. In additions, other embodiments may include different contextual segmentations. Other embodiment may also include different types of audio content.

The context losses shown in FIG. 2 may be used as the default audio resumption settings. These time intervals may be adjusted using reinforced learning. These settings may also be directly adjusted by the user.

Figure 3:
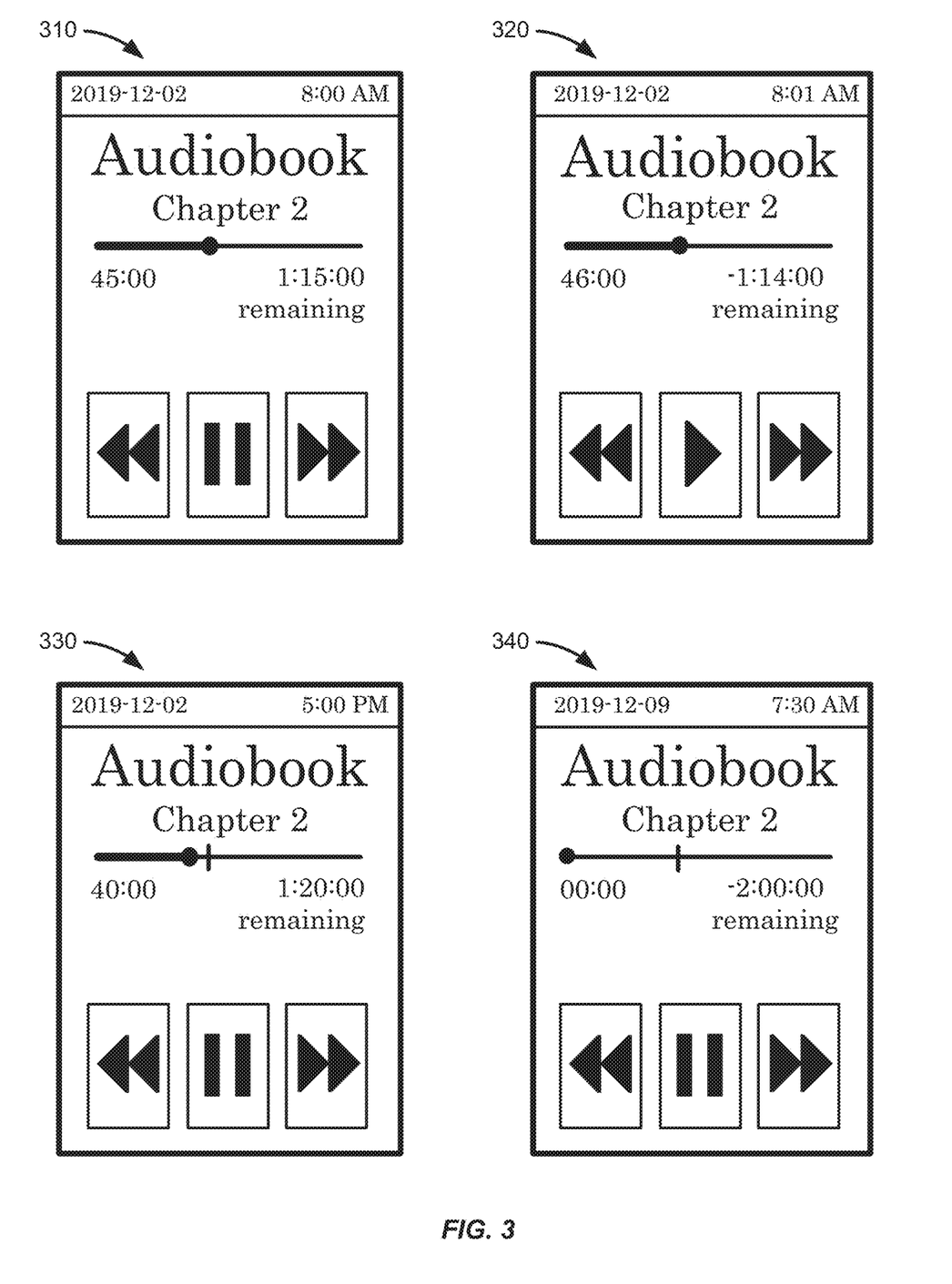
FIG. 3 shows user interfaces of an audio playback software application, according to an embodiment.

As described above, an audio playback device may provide an audio playback user interface. FIG. 3 shows user interfaces 310, 320, 330, and 340 of an audio playback software application, according to an embodiment. The first user interface 310 (top-left) shows audio content being played back. The second user interface 320 (top-right) shows the audio content paused. The third user interface 330 (bottom-left) shows the audio content being resumed at a resumption point determined using the intelligent audio playback technique described herein. And the fourth user interface 340 (bottom-right) shows an alternative resumption point if the pause interval was longer compared to the resumption shown in the third user interface 330.

As shown in the first user interface 310, at 8:00 AM on Dec. 2, 2019, the listener may be forty-five minutes into chapter two of an audiobook. As shown in the second user interface 320, the user may pause playback of the audiobook at 8:01 AM of the same day. The user may have paused playback by selecting the pause/play button. In this example, the audio is paused forty-six minutes into chapter 2.

The third user interface 330 and the fourth user interface 340 show the different resumption points determined by the intelligent audio playback technique for different pause interval lengths. In one example shown in the third user interface 330, playback is resumed at 5:00 PM. In this example, the context loss is determined to be the section context as the pause interval is fifteen minutes or longer but less than twenty-four hours using the context losses shown in FIG. 2. In this example, the start of the section may be determined (e.g., using the audio analysis software module described herein) to be at forty minutes into chapter 2. Accordingly, the resumption point is set to forty minutes into chapter two when resuming playback.

In a different example shown in the fourth user interface 340, the audio playback is paused at 8:01 AM on Dec. 2, 2019 as before but playback is resumed at 7:30 AM on Dec. 9, 2019. As such, the lost context is the chapter context since the pause interval is at least twenty-four hours but less than thirty days using the context losses shown in FIG. 2. In this example, the start of the chapter may be determined (e.g., using the audio analysis software module described herein) to be at zero seconds into chapter 2. Accordingly, the resumption point is set to zero seconds into chapter two when resuming playback.

Figure 4:
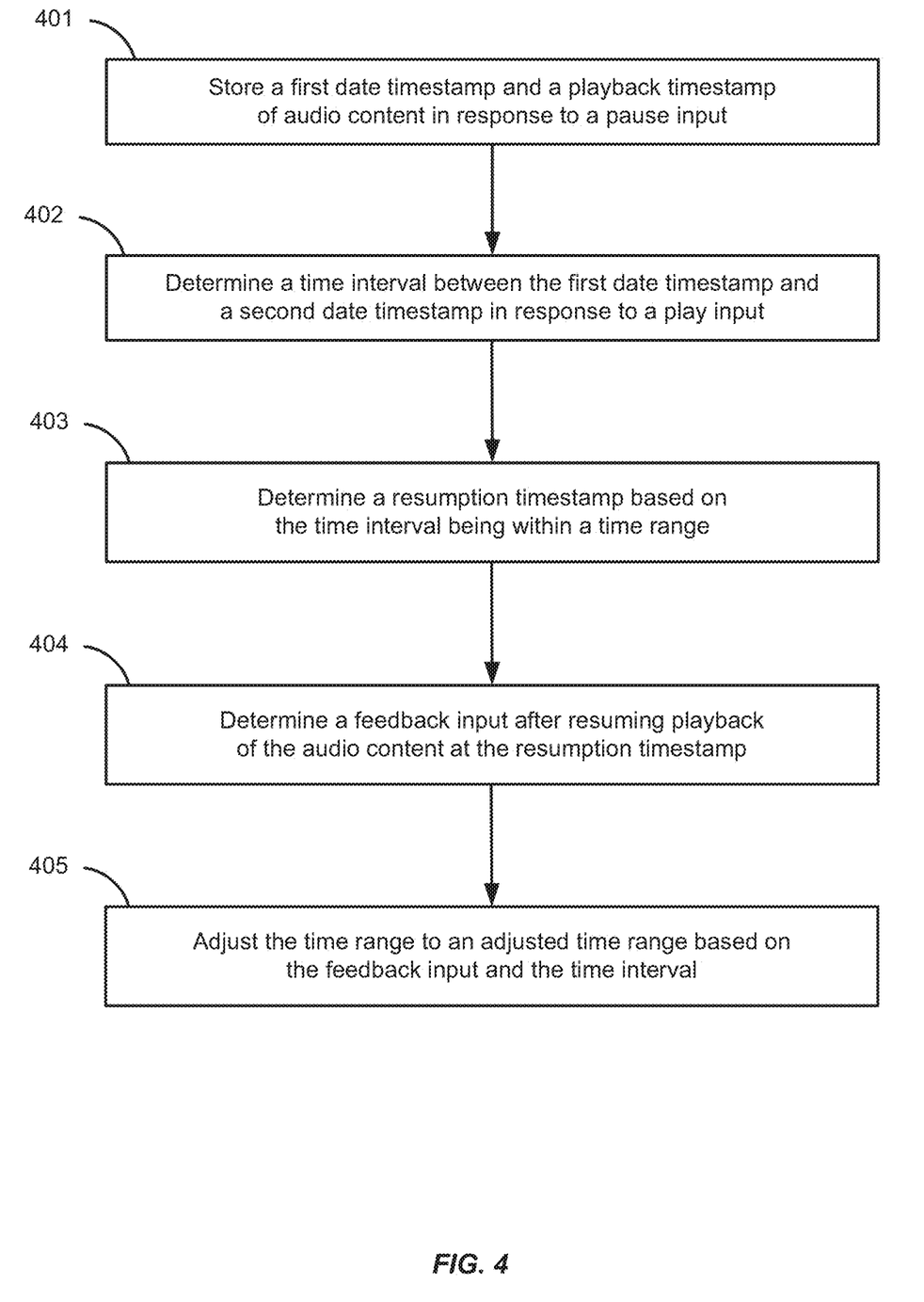
FIG. 4 shows a flowchart of a method for audio playback, according to an embodiment.

As described above, audio playback may be resumed at different points in the audio content depending on the pause interval. FIG. 4 shows a flowchart of a method for audio playback, according to an embodiment.

At 401, the method includes storing a first date timestamp and a playback timestamp of audio content in response to a pause input. The first date timestamp may indicate a date and a time when the audio content was paused. The pause input may be an input to a playback user interface by the user, such as pressing a pause button. The playback timestamp may indicate how far into the audio the playback was when paused.

At 402, the method includes determining a time interval between the first date timestamp and a second date timestamp in response to a play input. The play input may be an input to a playback user interface by a user such as pressing a play button. The second date timestamp may indicate a date and a time when the audio content was resumed (e.g., played again after being paused).

At 403, the method includes determining a resumption timestamp based on the time interval being within a time range. The resumption timestamp may indicate the point in the audio content to resume playback. For example, if the resumption timestamp indicates zero seconds, then playback is resumed from the start of the audio content. If the resumption timestamp indicates forty minutes, then playback of the audio content is resumed forty minutes into the audio content. The resumption timestamp may be less than (e.g., earlier than) the playback timestamp stored in response to the pause input since as the resumption timestamp is set to enable the listener to reobtain the context that they lost over the pause interval.

At 404, the method includes determining a feedback input after resuming playback of the audio content at the resumption timestamp. In some embodiments, the feedback input includes a fast-forward input or a rewind input (e.g., to a user interface). In some embodiments, the feedback input includes a response to a request for user feedback based on the resumption timestamp. The request for user feedback may be presented to the user at a predetermined time after the resuming of the playback of the audio content.

At 405, the method includes adjusting the time range to an adjusted time range based on the feedback input and the time interval. The adjusted time range usable in subsequent resumption of content (e.g., subsequent resumption of this audio content or other audio content).

In some embodiments, the method further includes storing resumption settings including a plurality of time ranges. In some embodiments, each time range of the plurality of time ranges corresponding to a different context loss amount. In some embodiments, the method further includes adjusting the resumption settings using a reinforcement learning algorithm based on the feedback input.

In some embodiments, the feedback input includes a fast-forward input. In such embodiments, the adjusting of the time range may include increasing a minimum time of the time range. For example, if a time range of one minute to less than fifteen minutes corresponds to the loss of the sentence context and the user fast-forwards when playback is resumed at the start of the current sentence after a two minute pause interval, then the minimum time of the time range (e.g., one minute) may be increased. For example, the time range corresponding to the loss of the sentence context may be adjusted from the range of "one minute to less than fifteen minutes" to the range of "two minutes to less than fifteen minutes." In addition, the time range corresponding to no context loss may also be adjusted to "less than two minutes" accordingly, for example.

In some embodiments, the feedback input may include a rewind input. In such embodiments, the adjusting of the time range may include decreasing a maximum time of the time range. For example, if a time range of one minute to less than fifteen minutes corresponds to the loss of the sentence context and the user rewinds when playback is resumed at the start of the current sentence after a two minute pause interval, then the maximum time of the time range (e.g., fifteen minutes) may be decreased. For example, the time range corresponding to the loss of the sentence context may be adjusted from the range of "one minute to less than fifteen minutes" to the range of "one minute to less than two minutes." In addition, the time range corresponding to the loss of the section context may be adjusted to the range of "two minutes to less than twenty-four hours" accordingly, for example.

In some embodiments, the method may further include requesting user feedback based on the resumption timestamp at a predetermined time after the resuming of the playback of the audio content, wherein the feedback input includes the user feedback. For example, the user may be prompted to answer one or more questions about whether the playback is being rewound too much or too little.

In some embodiments, the method may further include determining an audio pause length corresponding to a context loss amount based on the time interval being within the time range. For example, the context loss amount may be none, a sentence, a section, a chapter, or the full content. The context loss may be determined using one or more time intervals, such as those shown in FIG. 2. In such embodiments, the method may further include determining a pause of at least the audio pause length in the audio content based on an amplitude of an audio signal of the audio content. For example, a pause length of one second to two seconds may indicate a break between sections of an audiobook and pause lengths greater than two seconds may indicate breaks between chapters of an audiobook. The method may further include generating an audio waveform of the audio content and analyzing the waveform to determine breaks in the content based on an amplitude of the waveform dropping below a certain threshold. In such embodiments, the method may further include determining a segment of the audio content separated by the pause. In such embodiments, the determining of the resumption timestamp may be based on a start timestamp of the segment.

In some embodiments, the audio content is an audiobook. In some embodiments, the time range includes one day to thirty days. In some embodiments, the playback timestamp is within a chapter of the audiobook. In some embodiments, the resumption timestamp is at a start of the chapter.

Figure 5:
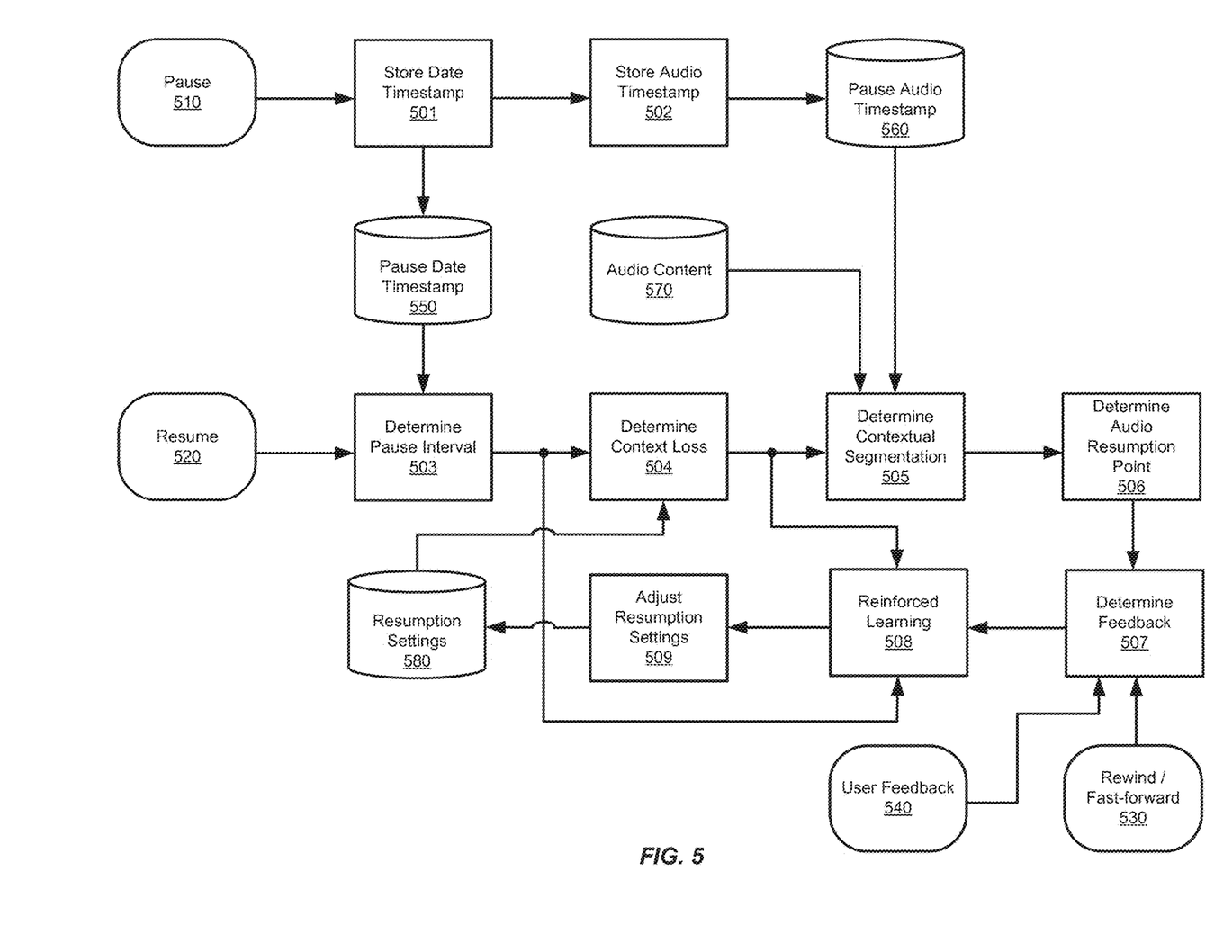
FIG. 5 shows a process diagram of audio playback resumption and reinforced learning of resumption settings, according to an embodiment.

FIG. 5 shows a process diagram of audio playback resumption and reinforced learning of resumption settings, according to an embodiment. This process may be performed by an audio playback device as described herein. The processes shown in FIG. 5 may be performed in response to user input, such as a pause input 510, a resume input 520, a rewind or fast-forward input 530, or a user feedback input 540.

The process starts when a user provides a pause input 510. The pause input 510 may cause playback of audio content 570 to be paused. At 501, the current date timestamp may be stored as a pause date timestamp 550. The pause date timestamp 550 may indicate a date and a time when the pause input 510 was made. The pause date timestamp 550 may be stored in response to the pause input 510.

At 502, the current audio timestamp may be stored as a pause audio timestamp 560. The pause audio timestamp 550 may be stored in response to the pause input 510. The pause audio timestamp may indicate how far into the audio content the playback was when the pause input 510 was made.

At some point in time after the pause input 510, a resume input 520 may be made by the user. At 503, the pause interval is determined. The pause interval may be the length of time between the pause date timestamp and a resume date timestamp. The resume date timestamp may indicate when the resume input 520 was made.

At 504, the context loss may be determined. The context loss may be determined using stored resumption settings 580. The resumption settings 580 may include a plurality of time ranges and each time range of the plurality of time ranges corresponding to a different context loss amount. For example, the resumption settings 580 may include the time ranges and corresponding context loss amounts described above with respect to FIG. 2.

At 505, the contextual segmentation of the audio content 570 may be determined. For example, a waveform or signal of the audio content 570 may be analyzed to determine the lengths of pauses or breaks in the content, which may be determined to correspond to different contextual segments. For instance, longer pauses may corresponds to higher contexts in a context hierarchy while shorter pauses corresponds to lower contests in the hierarchy, where higher contexts include each of the lower contexts (e.g., an audiobook includes one or more chapter contexts, each of which includes one or more section contexts, each of which include one or more sentence contexts).

At 506, the audio resumption point audio playback is determined. For example, the analysis of the audio content 570 may include determining audio timestamps corresponding to the start of each of the contextual segments. For example, if the audio playback is paused thirty minutes into playback, then the start of the current sentence context may begin twenty-nine minutes and thirty seconds into playback, the start of the current section may start twenty-eight minutes into playback, and the start of the current chapter may start zero seconds into playback. Then playback is resumed at this resumption point.

At 507, the feedback may be determined at some point after resuming playback. For example, the user may provide a rewind or fast-forward input 530 within a certain timeframe, which may then be considered feedback, or they may provide user feedback 540 in response to being prompted for their feedback.

At 508, the feedback may be provided to a reinforced learning algorithm along with the determined loss of context. The reinforced learning algorithm may use the feedback to determine whether to change the time ranges associated with the loss of context.

At 508, the resumption settings 580 may be adjusted based on the reinforced learning algorithm. For example, the minimum and maximum times for one or more time ranges may be increased or decreased in order to match the user's actual loss of context.

This process is advantageous because audio playback may be resumed at an earlier position than when playback was paused such that the user may retrieve the context that they lost. In addition, the reinforced learning based on feedback from the user provides for playback resumption customized to the memory capacity of the individual user. In addition, the audio resumption point for an audiobook may be set to the beginning of the current sentence, section, or chapter such that the listener can hear the complete context again, minimizing the amount of manual seeking required. In addition, the process is advantageous because the use of reinforced learning enables the resumption settings to change as the listeners memory and recollection capacity changes.

FIG. 6 shows a diagram of hardware of a special purpose computing machine for implementing systems and methods described herein. The following hardware description is merely one example. It is to be understood that a variety of computers topologies may be used to implement the above described techniques. The hardware shown in FIG. 6 may be used to implement the audio playback device providing intelligent audio playback resumption described herein.

An example computer system 610 is illustrated in FIG. 6. The computer system 610 includes a bus 605 or other communication mechanism for communicating information, and one or more processor(s) 601 coupled with bus 605 for processing information. The computer system 610 also includes a memory 602 coupled to bus 605 for storing information and instructions to be executed by processor 601, including information and instructions for performing some of the techniques described above, for example. This memory may also be used for storing programs executed by processor(s) 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device and memory are both examples of non-transitory computer readable storage mediums.

The computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses, for example.

The computer system also includes a network interface 604 coupled with bus 605. The network interface 604 may provide two-way data communication between computer system 610 and a network 620. The network interface 604 may be a wireless or wired connection, for example. The computer system 610 can send and receive information through the network interface 604 across a local area network, an Intranet, a cellular network, or the Internet, for example. In the Internet example, a browser, for example, may access data and features on backend systems that may reside on multiple different hardware servers 631-634 across the network. The servers 631-634 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer-implemented method, comprising:
    storing a first date timestamp and a playback timestamp of audio content in response to a pause input;
    determining a time interval between the first date timestamp and a second date timestamp in response to a play input;
    determining a resumption timestamp based on the time interval being within a time range;
    determining a feedback input after resuming playback of the audio content at the resumption timestamp, the feedback input including a fast-forward input or a rewind input; and
    adjusting the time range to an adjusted time range based on the feedback input and the time interval, the adjusting of the time range including increasing a minimum time of the time range based on the fast-forward input or decreasing a maximum time of the time range based on the rewind input, the adjusted time range usable in subsequent resumption of content.

2. The computer-implemented method of claim 1, further comprising:

storing resumption settings including a plurality of time ranges, each time range of the plurality of time ranges corresponding to a different context loss amount; and adjusting the resumption settings using a reinforcement learning algorithm based on the feedback input.

3. The computer-implemented method of claim 1, further comprising:

requesting user feedback based on the resumption timestamp at a predetermined time after the resuming of the playback of the audio content, wherein the feedback input includes the user feedback.

4. The computer-implemented method of claim 1, further comprising:

determining an audio pause length corresponding to a context loss amount based on the time interval being within the time range;

determining a pause of at least the audio pause length in the audio content based on an amplitude of an audio signal of the audio content;

determining a segment of the audio content separated by the pause, the determining of the resumption timestamp being based on a start timestamp of the segment.

5. The computer-implemented method of claim 1, wherein the audio content is an audiobook, wherein the time range includes one day to thirty days, wherein the playback timestamp is within a chapter of the audiobook, and wherein the resumption timestamp is at a start of the chapter.

6. A non-transitory machine-readable medium storing a program executable by at least one processing unit of a device, the program comprising sets of instructions for:

storing a first date timestamp and a playback timestamp of audio content in response to a pause input;

determining a time interval between the first date timestamp and a second date timestamp in response to a play input;

determining a resumption timestamp based on the time interval being within a time range;

determining a feedback input after resuming playback of the audio content at the resumption timestamp, the feedback input including a fast-forward input or a rewind input; and adjusting the time range to an adjusted time range based on the feedback input and the time interval, the adjusting of the time range including increasing a minimum time of the time range based on the fast-forward input or decreasing a maximum time of the time range based on the rewind input, the adjusted time range usable in subsequent resumption of content.

7. The non-transitory machine-readable medium of claim 6, wherein the program further comprises sets of instructions for:

storing resumption settings including a plurality of time ranges, each time range of the plurality of time ranges corresponding to a different context loss amount; and adjusting the resumption settings using a reinforcement learning algorithm based on the feedback input.

8. The non-transitory machine-readable medium of claim 6, wherein the program further comprises sets of instructions for:

requesting user feedback based on the resumption timestamp at a predetermined time after the resuming of the playback of the audio content, wherein the feedback input includes the user feedback.

9. The non-transitory machine-readable medium of claim 6, wherein the program further comprises sets of instructions for:

determining an audio pause length corresponding to a context loss amount based on the time interval being within the time range;

determining a pause of at least the audio pause length in the audio content based on an amplitude of an audio signal of the audio content;

determining a segment of the audio content separated by the pause, the determining of the resumption timestamp being based on a start timestamp of the segment.

10. The non-transitory machine-readable medium of claim 6, wherein the audio content is an audiobook, wherein the time range includes one day to thirty days, wherein the playback timestamp is within a chapter of the audiobook, and wherein the resumption timestamp is at a start of the chapter.

11. A computer system, comprising:

one or more processors;

memory; and computer program code comprising instructions, executable on the one or more processors, the computer program code configured to:

store a first date timestamp and a playback timestamp of audio content in response to a pause input;

determine a time interval between the first date timestamp and a second date timestamp in response to a play input;

determine a resumption timestamp based on the time interval being within a time range;

determine a feedback input after resuming playback of the audio content at the resumption timestamp, the feedback input including a fast-forward input or a rewind input; and adjust the time range to an adjusted time range based on the feedback input and the time interval, the adjusting of the time range including increasing a minimum time of the time range based on the fast-forward input or decreasing a maximum time of the time range based on the rewind input, the adjusted time range usable in subsequent resumption of content.

12. The computer system of claim 11, wherein the computer program code is further configured to:

store resumption settings including a plurality of time ranges, each time range of the plurality of time ranges corresponding to a different context loss amount; and adjust the resumption settings using a reinforcement learning algorithm based on the feedback input.

13. The computer system of claim 11, wherein the computer program code is further configured to:

request user feedback based on the resumption timestamp at a predetermined time after the resuming of the playback of the audio content, wherein the feedback input includes the user feedback.

14. The computer system of claim 11, wherein the computer program code is further configured to:

determine an audio pause length corresponding to a context loss amount based on the time interval being within the time range;

determine a pause of at least the audio pause length in the audio content based on an amplitude of an audio signal of the audio content;

determine a segment of the audio content separated by the pause, the determining of the resumption timestamp being based on a start timestamp of the segment.

15. The computer system of claim 11, wherein the audio content is an audiobook, wherein the time range includes one day to thirty days, wherein the playback timestamp is within a chapter of the audiobook, and wherein the resumption timestamp is at a start of the chapter.

* * * * *